March 18, 1969  V. R. ROGSTAD ET AL  3,434,045

LOW-VOLUME CHAMBER FOR ELECTRICAL POTENTIAL MEASUREMENTS

Filed Aug. 25, 1966

Vernon R. Rogstad
Robert W. Sims
*INVENTORS*

BY *M. N. Davis*

ATTORNEY

United States Patent Office 3,434,045
Patented Mar. 18, 1969

3,434,045
LOW-VOLUME CHAMBER FOR ELECTRICAL POTENTIAL MEASUREMENTS
Vernon R. Rogstad, Texas City, and Robert W. Sims, Pasadena, Tex., assignors to Monsanto Company, St. Louis, Mo., a corporation of Delaware
Filed Aug. 25, 1966, Ser. No. 575,028
U.S. Cl. 324—30                     5 Claims
Int. Cl. G01r 31/00

ABSTRACT OF THE DISCLOSURE

A low-volume chamber for use in measuring the electrical potential of liquids obtained from gas-liquid mixtures passed through said chamber which is of a design such that the residence time of the liquid in the cell is very short so as to provide the sensitivity needed for the detection of very small changes in electrical potential of the liquid.

---

The present invention relates to a method and apparatus for the continuous measurement of the electrical potential of liquids. More particularrly, the present invention relates to a method and apparatus for the continuous measurement of the electrical potential of liquids contained in liquid-gas mixtures.

The methods and apparatus wherein the electrical potential of a liquid is measured by use of electrodes (or half cells as they are sometimes referred to in the literature) immersed in the liquids are generally used for such purposes as to indicate oxygen content in water, to indicate chlorine or other oxidizing agents in water, pH measurement, and measurement of cyanide potential. There are also electrodes available for the detection and measurement of such ions as the sodium ion or the phosphate ion. However, systems of the prior art for the measurement of electrical potential of liquids in liquid-gas mixtures are not suitable for many uses in that they do not provide the sensitivity required for detection of very small deviations in electrical potential such as small deviations in pH. The deficiencies of these prior art systems are largely due to the construction of the chambers which contain the electrodes and through which the liquid-gas mixture is passed. If the stream passing through a chamber has too long a residence time, then a continuous accurate representation of the electrical potential can not be obtained due to build up in the concentration of the components in the stream. Also in measuring the electrical potential of a liquid contained in a liquid-gas mixture, the liquid phase must be effectively separated from the gas phase so that bubbles do not form on the sensitive portion of the measuring electrode. Bubbles forming on this sensitive portion of the electrode or coming in contact with the sensitive portion immersed in a liquid alter the surface area which is in actual contact with the liquid and thus the bubbles impair the precision of the measurements and the reproducibility of the measurements.

It is, therefore, an object of the present invention to provide a new and novel method and chamber for measuring the electrical potential of liquids. Another object of the present invention is to provide a new and novel method and chamber for measuring the electrical potential of liquids in liquid-gas mixtures whereby extremely high sensitivity is obtained. Another object of the present invention is to provide a new and novel method and chamber for the measurement of electrical potential whereby a short residence time is provided. An additional object of the present invention is to provide a new and novel method and chamber for the measurement of electrical potential whereby the inaccuracies resulting from the formation of bubbles on the measuring electrode is substantially alleviated. Additional objects will become apparent from the following description of the invention herein disclosed.

These and other objects are accomplished by the present invention which makes use of a novel miniature chamber through which a liquid-gas mixture passes in order for the electrical potential of the liquid to be measured. The low volume of the chamber and its unique design cause the liquid-gas mixture entering the chamber to be separated into a liquid phase and a gas phase, with the resulting liquid phase passing over an electrode or electrodes so as to detect and measure the electrical potential of the liquid. The chamber is so designed that the residence time of the liquid in the cell is very low so as to provide the sensitivity needed for the detection of very small changes in the electrical potential of the liquid.

The present invention in one of its embodiments is a chamber having a bottom, a top, a first side wall, a second side wall, a first end wall and a second end wall, said bottom being substantially horizontal, said first side wall and said first end wall being substantially vertical with respect to said bottom, said second end wall extending substantially vertically upward from the bottom of said chamber for at least one-fourth the distance from said bottom to the lowest portion of the top of said chamber and then at least a part of said second end wall being inclined away from said first end wall at an angle of at least ten degrees, said second side wall having a lower portion and an upper portion, said lower portion of said second side wall extending vertically upward from the bottom of said chamber for a distance which is greater than the distance by which said second end wall extends vertically upward from the bottom of the chamber, said upper portion of said second side wall being inclined away from said first side wall at an angle of at least ten degrees, the upper portion of said second end wall being provided with an opening to the exterior of said chamber so as to allow the exit of fluids from said chamber, the interior of said chamber also being in open communication with the exterior of said chamber substantially at that corner of said chamber formed by said upper portion of said second side wall and said first end wall so as to allow the entry of fluids into said chamber, the distance from said first end wall to said second end wall being at least as great as the distance from said first side wall to said second side wall, both distances being measured below where said second end wall is inclined. The total volume of the chambers of the present invention is generally from about 0.2 cubic centimeter to about 10 cubic centimeters and the chambers preferably have a total volume of from about 0.4 cubic centimeter to about 2.0 cubic centimeters.

In another embodiment, the present invention is a method for the measurement of the electrical potential of a liquid contained in a liquid-gas mixture comprising passing said mixture through a conduit to a chamber having at least one electrode therein, means attached to said electrode for detecting and measuring electrical potential of said liquid, said chamber having a bottom, a top, a first side wall, a second side wall, a first end wall and a second end wall, said bottom being substantially horizontal, said first side wall and said first end wall being substantially vertical with respect to said bottom, said second end wall extending substantially vertically upward from the bottom of said chamber for at least one-fourth the distance from said bottom to the lowest portion of the top of said chamber and then at least a part of said second end wall being inclined away from said first end wall at an angle of at least ten degrees, said second side wall having a lower portion and an upper portion, said lower portion of said second side wall extending vertically upward from the bottom of said chamber for a distance which is greater than the distance by which said second end wall extends vertically upward from the bottom of the chamber, said upper portion of said second side wall being inclined away from said first side wall at an angle of at least ten degrees, the upper portion of said second end wall being provided with an opening to the exterior of said chamber so as to allow the exit of fluids from said chamber, the interior of said chamber also being in open communication with the exterior of said chamber by means of said conduit substantially at that corner of said chamber formed by said upper portion of said second side wall and said first end wall so as to allow the entry of fluids into said chamber, the distance from said first end wall to said second end wall being the length of said chamber, the distance from said first side wall to said second wall being the width of said chamber, said length being at least as great as said width when measured below where said second end wall starts to incline.

This invention will be readily understood from the drawings which show a preferred configuration for the chamber of the present invention together with a conduit entering the chamber. These drawings are for illustrative purposes only and are not to be taken in a limiting sense.

The terms "vertical" and "horizontal" as used in the description of the drawings are in reference to the apparatus in its normal operating position. The same numerals are used in all the drawings to denote like elements.

Figure 2:
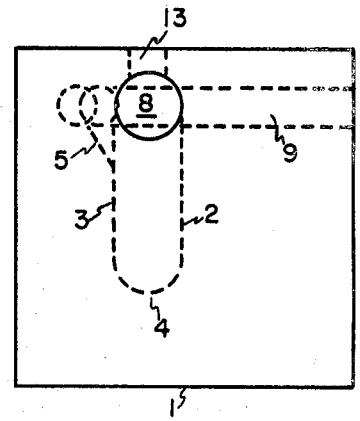
FIGURE 2 is an end view of the apparatus of FIGURE 1 in its normal operating position taken along a plane corresponding to line 2—2 of FIGURE 1.
Figure 3:
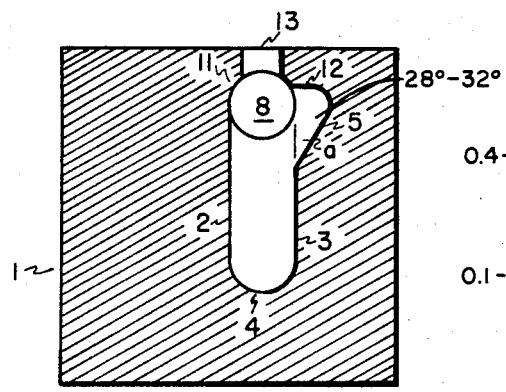
FIGURE 3 is a sectional view taken along a plane corresponding to line 3—3 of FIGURE 1.

Referring now to the figures, the illustrated apparatus comprises block 1 containing a chamber constructed in accordance with the present invention. The chamber has a first side wall 2 which is flat, as may be seen in FIGURE 1, and vertical, as may be seen in FIGURES 2 and 3. A second side wall, as may be seen in FIGURES 2 and 3, has a lower portion 3 which extends vertically upward from the chamber's bottom 4 for a distance and has an upper portion 5 which is inclined at an angle $a$ away from side wall 2. Both lower portion 3 and upper portion 5 of the second side wall are depicted as flat with their line of intersection being horizontal. Although first side wall 2 is depicted in the drawings as being flat and the second side wall as being of two flat portions, 3 and 5, either or both of these walls may be slightly concave or convex and still be within the scope of the present invention. The distance lower portion 3 of the second side wall extends vertically upward from the bottom 4 of the chamber should be from about one-third to two-thirds the distance from the bottom of the chamber to the top of the chamber. The distance which lower portion 3 extends vertically upward from bottom 4 will usually be from 0.5 to 2.0 centimeters. The angle, indicated as angle $a$, at which upper portion 5 of the second side wall is inclined away from side wall 2 may vary from 10 degrees to 85 degrees but will usually be within the range from 20 to 60 degrees. Angle $a$ is preferably from about 28 to 32 degrees. As may be seen, this angle is measured from the vertical.

Still referring to the drawings, the chamber has two end walls 6 and 7. As may be seen in FIGURE 4, end wall 6 is substantially vertical while end wall 7 extends vertically from the bottom 4 of the chamber for a distance and is then inclined in a direction away from end wall 6 at an angle $b$. The distance which end wall 7 extends vertically from bottom 4 of the chamber will usually be about 0.3 to 1.0 centimeters and will usually be about one-fourth the one-half the distance from the bottom of the chamber of the present invention to the lowest portion of the top of the chamber of the present invention. The distance from end wall 6 to end wall 7 hereinafter called the length, will generally be at least as great as the distance from first side wall 2 to the second side wall, hereinafter called the width, both distances being measured below the point at which either the second side wall or end wall 7 is inclined. The ratio of the length to the width is usually from 1.5:1 to 5:1, preferably about 2:1 to 4:1. Angle $b$ at which the upper portion 7 of the second side wall is inclined may vary from about 10 degrees to 85 degrees but will usually be from 20 to 60 degrees and is preferably from about 28 to 32 degrees. As was pointed out previously, the drawings are not to be construed as limiting the present invention and walls 6 and 7 need not be concave as depicted but may be flat or even slightly convex. Likewise, the bottom of the chamber need not be concave but can be flat or convex according to the present invention. It is preferred, however, that end walls 6 and 7 as well as bottom 4 of the chamber be concave with respect to the interior of said chamber.

The chamber is in open communication with the exterior of block 1 by opening 8 through which fluids exit from the chamber. The fluids enter the chamber by means of a conduit having two sections 9 and 10 which in the particular embodiment depicted in the drawings is actually a hollow section of the block 1 containing the chamber of the present invention. As may be seen in FIGURES 2 and 4, both sections of the conduit are essentially horizontal when the chamber and conduit are in their normal operating position. Referring to the top view, FIGURE 1, it may be seen that section 9 of the conduit enters block 1 perpendicular to the plane in which side wall 2 lies and then forms an elbow before entering the chamber near the corner formed by upper portion 5 of the second side wall and end wall 6. The top of the chamber in the particular embodiment depicted in the drawings has a concave portion 11 and a flat portion 12. However, the chambers of the present invention may have tops of various shapes such as a flat top which is horizontal or which slopes, or which is concave across the entire width or length of the top.

Still referring to the drawings, the top of the chamber depicted therein has two openings 13 through which electrodes may be inserted into the chamber for the purpose of measuring electrical potential of liquids flowing therethrough. It is readily apparent, however, that the number of openings 13 provided for the insertion of electrodes will vary according to the number of electrodes used in a particular measuring system. The electrodes useful in the present invention may be of various shapes and sizes provided they are small enough to be used in the chamber of the present invention. These electrodes are generally referred to as miniature electrodes, such as those used in hematology studies. Generally, two electrodes will be used, each constituting a half cell; however, electrodes are available wherein both half cells are contained in one electrode so that only one electrode is needed for measurement of an electrical potential. Also, there are various schemes in the prior art for measuring electrical potential wherein three or more electrodes are employed. The electrodes useful in the present invention may be constructed of various materials such as glass, silver, tungsten, antimony, gold, platinum, and the like. The detecting equipment used in operation of the present invention is that conventionally used in measurements of electrical potential and need not be discussed herein.

The chambers of the present invention may be constructed of various materials provided they are of sufficient strength and are not reactive with the system being analyzed. Some examples of suitable materials are stainless steel, glass, aluminum, alloy metals, and brass or synthetic resins such as poly(tetrafluoroethylene), nylon, epoxy resins such as the epichlorohydrin-biphenol resins, and the like. It is generally not important what shape the exterior of the chamber takes as long as the interior of the chamber is constructed according to the present invention as described herein. These chambers as well as the conduit leading to them may be, as depicted in the drawings, constructed by hollowing a block so as to provide a cavity of the desired size and shape. Also, the chamber could be molded so that the exterior of the chamber conforms essentially to the shape of the interior of the chamber with an opening provided for the attachment of a conduit which has been separately manufactured.

Figure 1:
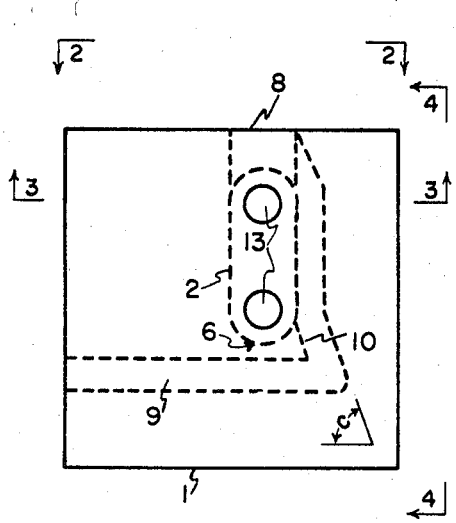
FIGURE 1 is a top view of a preferred chamber and entry conduit in their normal operating position according to the present invention.

The conduits used in connection with the chambers of the present invention preferably enter the chamber in the manner depicted in the drawings. As may be seen in the drawings, the conduit has a first section 9 and a second section 10, both of which are substantially straight with their axes lying in a single horizontal plane. One end of section 10 of the conduit intersects the chamber in the corner formed by end wall 6 and upper portion 5 of the second side wall. From FIGURES 2 and 4 it may be seen that one end section 10 of the conduit enters near the top of the chamber with the top of the conduit substantially on the same level as the top of the chamber at the point of entry. The other end of section 10 of the conduit intersects section 9 so as to form angle c between section 9 and section 10. Angle c usually varies from 58 to 62 degrees. Section 9 of the conduit, if axially extended, will generally intersect a vertical plane bisecting bottom 4 of the chamber lengthwise at an angle of from 80 to 90 degrees, and preferably 90 degrees. In the chamber depicted, such a vertical plane would be parallel to side wall 2. Referring specifically to FIGURE 1, it may be seen that section 9 of the conduit is substantially perpendicular to a plane containing side wall 2, which wall appears as a line in FIGURE 1, or the foregoing described vertical plane which bisects bottom 4 of the chamber lengthwise. The conduits used with the present invention may be constructed of the same or a different material as the chamber. The conduits are preferably circular in cross-section but may be other shapes such a eliptical or square.

Figure 4:
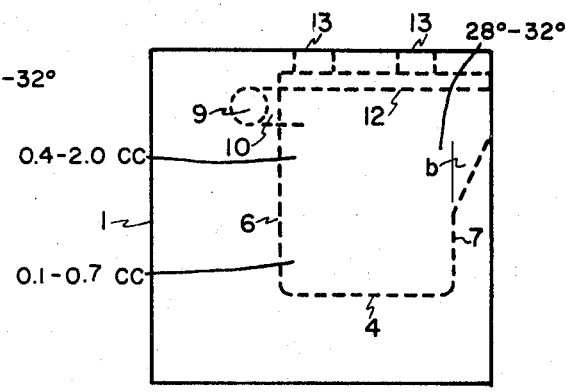
FIGURE 4 is a side view of the apparatus of FIGURE 1 in its normal operating position taken along a plane corresponding to line 4—4 of FIGURE 1.

In using the chambers of the present invention, the electrodes are inserted into the chamber with the ends or sensitive portion of the electrodes extending to near the bottom of the chamber. Referring to the drawings, particularly FIGURE 4, the electrodes will extend to a point below where end wall 7 is inclined. The liquid-gas mixture enters the chamber through the conduit and due to the construction of the chamber, the liquid is separated from the gas and falls to the bottom of the chamber. The liquid-gas mixture is fed to the chamber at a rate sufficient to maintain the liquid level in the chamber at or near the point where end wall 7 starts to incline. The liquid exits the chamber by being forced up the inclined portion of end wall 7 to opening 8. The volume of the portion of the chamber below the point at which end wall 7 starts to incline will generally be about 0.06 cubic centimeter to 4 cubic centimeters, and is usually from 0.1 to 0.7 cubic centimeter. Of course, this volume will depend to a large extent on the size of the particular electrode or electrodes being used, and for the most miniature electrodes this volume is from about 0.2 to 0.3 cubic centimeter.

The following example is given in order to illustrate but not to limit the present invention.

*Example*

A chamber and conduit leading thereto were constructed as shown in the drawings by hollowing a block of an epichlorohydrin-biphenol resin. The distance between side wall 2 and side wall 3 was 5/32 inch while the distance from end wall 5 to end wall 6 was 0.39 inch, both distances being measured below the point where end wall 6 is inclined. The distance from the lowest point of the bottom of the chamber to the point where end wall 6 started to incline was 3/16 inch and the distance to where side wall 3 started to incline was about 10/32 inch. The chamber and conduit were constructed so that angle a was about 30°, angle b was about 30°, angle c was about 60°. The distance from the bottom of the chamber to the center line of the conduit and hole 7 was about 15/32 inch, the conduit having a 0.093 inch diameter and hole 7 a 5/32 inch diameter. Two holes were provided in the top of the chamber as shown in the drawings for the insertion of a pair of miniature electrodes of the type manufactured by Leeds & Northrup. Each of these miniature electrodes was about 1/8 inch in diameter and the electrodes were placed so as to be within about 1/64 inch of the bottom of the chamber. The foregoing apparatus was used for the continuous determination of the content of HCl in a gas stream. The gas stream under a pressure of about 7 p.s.i.g. and flowing at about 3450 cc./minute was mixed with high purity nitrogen at about atmospheric pressure and flowing at about 1400 cc./minute. The resulting gas mixture was then further mixed with water of a known pH flowing at about 5 ml./minute in order for the HCl in the gas mixture to be dissolved in the water. The nitrogen was added so as to scrub any $CO_2$ out of the water. The gas-liquid mixture was then passed through the foregoing described apparatus wherein the pH of the water containing the HCl was measured. From this the hydrogen ion concentration in the liquid was determined by conventional calculations and the portions attributable to the dissolved HCl determined. The apparatus was so sensitive that less than one part per billion HCl in the gas stream could be detected.

Although the present invention has been described in relation to the measurement of the electrical potential of liquids in liquid-gas mixtures, it may also be used to measure the electrical potential of liquids alone or of liquid-liquid mixtures. In the latter case, extreme sensitivity would still be achieved; however, obviously the chamber of the present invention would not perform the function of separating a gas from a liquid as no gas would be present.

What is claimed is:

1. A chamber having a bottom, a top, a first side wall, a second side wall, a first end wall and a second end wall, the long axis of said bottom being substantially horizontal, said first side wall and said first end wall being substantially vertical with respect to said bottom, said second end wall extending substantially vertically upward from the bottom of said chamber for a distance and then at least a part of said second end wall being inclined away from said first end wall at an angle of at least ten degrees, said second side wall having a lower portion and an upper portion, said lower portion of said second side wall extending vertically upward from the bottom of said chamber for a distance which is greater than the distance by which said second end wall extends vertically upward from the bottom of the chamber, said upper portion of said second side wall being inclined away from said first side wall at an angle of at least ten degrees, the upper portion of said second end wall being provided with an opening to the exterior of said chamber so as to allow the exit of fluids from said chamber, the interior of said chamber also being in open communication with the exterior of said chamber substantially at that corner of said chamber formed by said upper portion of said second side wall and said first end wall so as to allow the entry of fluids into said chamber, the distance from said first end wall to said second end wall being at least as great as the distance from said first side wall to said second side wall, both distances being measured below where said second end wall is inclined.

2. The chamber of claim 1 wherein said first end wall is concave, said second end wall is concave, said first side wall is substantially flat, and both the upper portion and the lower portions of said second side wall are flat.

3. The chamber of claim 1 wherein the volume of that portion of said chamber below the point at which said second end wall starts to incline is from about 0.1 to 0.7 cubic centimeter.

4. The chamber of claim 1 wherein the total volume of said chamber is from about 0.4 to 2.0 cubic centimeters.

5. The chamber of claim 1 wherein both the angle at which said part of said second end wall is inclined away from first end wall and the angle at which said upper portion of said second side wall is inclined away from said first side wall are from about 28 to 32 degrees.

References Cited

UNITED STATES PATENTS

| 2,146,312 | 2/1939 | Powell et al. | 324—30 |
| 3,287,631 | 11/1966 | Stout | 324—30 |

RUDOLPH V. ROLINEC, *Primary Examiner.*

C. F. ROBERTS, *Assistant Examiner.*

U.S. Cl. X.R.

55—19